United States Patent [19]

Christensen

[11] 4,149,931

[45] Apr. 17, 1979

[54] DIVERTOR FOR USE IN FUSION REACTORS

[75] Inventor: Uffe R. Christensen, Trenton, N.J.

[73] Assignee: The United States of America as represented by the United States Department of Energy, Washington, D.C.

[21] Appl. No.: 379,870

[22] Filed: Jul. 16, 1973

[51] Int. Cl.$^2$ .................................................. G21B 1/00
[52] U.S. Cl. ....................................... 176/9; 315/111.2
[58] Field of Search .............................. 176/1, 2, 3, 9; 315/111.2

[56] References Cited

U.S. PATENT DOCUMENTS

| | | | |
|---|---|---|---|
| 3,015,618 | 1/1962 | Stix | 176/2 |
| 3,278,384 | 10/1966 | Lenard et al. | 176/3 |
| 3,580,802 | 5/1971 | Johnson et al. | 176/1 |
| 3,607,627 | 9/1971 | Furth et al. | 176/3 |

OTHER PUBLICATIONS

Nuclear Fusion, vol. 11, 3/71, by Gourdon et al., pp. 161–166.
H. K. Forsen, Lecture notes for lectures given in 1969 in a reactor design course at the University of Wis.
LA-4250, 4/69, pp. (A4–1)–(A4–4).
Nuclear Fusion, vol. 10, 6/70, by Loktionov et al., pp. 179–183.
CONF-740402-P1, vol. 1, 4/74, pp. 417–421.
CONF-730315, 3/73, "Internal Ring Exp. at Princeton Plasma Physics Lab", by Yoshikawa, identified as pages 1 and 2.
Physics of Fluids, vol. 9, 1966, pp. 2295, 2296 by Yoshikawa et al.
UCRL-50807, 6/70, pp. 1–8, by Laurer.
UWFDM-68, 11/73, vol. 1, pp. (III–A–1)–(III–D–6).
CONF-721111, 11/72, pp. 677–683.
MATT-1050, Aug. 1975, p. 529.
WASH-1267, Jul. 1973, pp. 3–5, 7–10, 12–16, 22–24, 26–29, 31–34.
CONF-740402-P1, vol. 1, Apr. 1974, pp. 608–614.
The Challenge of Fusion, D. Van Nostrand Co. Ltd., 1960, p. 60.

Primary Examiner—Harvey E. Behrend
Attorney, Agent, or Firm—Paul Devinsky; Leonard Belkin; C. Daniel Cornish

[57] ABSTRACT

A poloidal divertor for a toroidal plasma column ring having a set of poloidal coils co-axial with the plasma ring for providing a space for a thick shielding blanket close to the plasma along the entire length of the plasma ring cross section and all the way around the axis of rotation of the plasma ring. The poloidal coils of this invention also provide a stagnation point on the inside of the toroidal plasma column ring, gently curving field lines for vertical stability, an initial plasma current, and the shaping of the field lines of a separatrix up and around the shielding blanket.

11 Claims, 5 Drawing Figures

DIVERTOR FOR USE IN FUSION REACTORS

This invention was made in the course of, or under a contract with the United States Atomic Energy Commission.

BACKGROUND OF THE INVENTION

In fusion reactors, there are essentially three ways in which energy may be transferred from the interior of a magnetically confined toroidal plasma column to the walls of the vacuum container, which is referred to in the art as the discharge tube. The first way is by emission of radiation in the form of soft x-rays (bremsstrahlung) as a result of continuous collisions of the rapidly moving high-energy charged particle in the plasma. Under the operating conditions of a full-scale fusion reactor, roughly 5% of the total energy released would be in the form of such radiation. The second way is by the slow ongoing diffusion of energetic particles outwardly across the confining magnetic field toward the walls of the discharge tube. In the case of a full-scale fusion reactor utilizing an equal mixture of deuterium and tritium, some 15% of the released energy would be carried away by these charged particles. The third way is by the emission of energetic thermonuclear reaction product neutrons, which would pass through the walls of the discharge tube and have to be captured in the region outside the discharge tube in a shielding blanket. About 80% of the released energy would be carried off in this form in a full scale fusion reactor.

Spitzer recognized that in a full-scale fusion reactor of the stellarator type, the walls of the discharge tube would be unable to withstand the energy impinging upon them from both the bremsstrahlung radiation and the outward-diffusing energetic particles. Accordingly, he modified the stellarator so that the outwardly diffusing particles would be prevented from reaching the main walls of the discharge tube, and be forced instead to dissipate their energy elsewhere. This modification, known as a toroidal "divertor", is shown in FIG. 4 of U.S. Pat. No. 2,910,414, and in FIG. 2 of U.S. Pat. No. 3,016,341.

The toroidal divertor was conceived as a basic component of a stellarator for confining a toroidal plasma column in a discharge tube forming a vacuum chamber, wherein the plasma was confined by an axial magnetic field coil around the discharge tube along an endless equilibrium axis. To this end, the axial field coil, which is also referred to in the art as a toroidal field coil for producing a toroidal magnetic field, produces toroidal field lines that were twisted with a rotational transform to provide concentric nested magnetic surfaces forming concentric shells of magnetic flux. Helical coils around the toroidal magnetic field provided the rotational transform and shear for stabilizing the stellarator plasma, as described in U.S. Pat. No. 3,002,912, the shear being defined herein (as in U.S. Pat. No. 3,607,627) as the rate at which the rotational transform changes in the nested set of co-axial surfaces from magnetic surface to magnetic surface, with r being the surface radius and L the length of the period over which the rotational transform is provided. Suitable helical stellarator coils, which are provided by a set of four parallel windings around the discharge tube having opposite currents in adjacent conductors and referred to in the art as l=2 windings, are described in U.S. Pat. No. 3,278,384 (1966).

The basic principle of the toroidal divertor is that by the use of a reversed magnetic field, the thin outer cylindrical shell of magnetic flux, near the discharge tube wall, is brought out locally from the main discharge tube and spread out into a wider chamber. Charged particles diffusing outwardly from the body of the plasma enter the magnetic flux shell and follow the lines of force into the chamber where they strike collector plates to which they transfer their energy as heat. In essence, the effect of the divertor is to surround the main toroidal plasma column by a protective sheath or scrape-off layer that leads to an auxiliary divertor chamber where heat can be removed and the resulting cooled products of the thermonuclear reaction, as well as impurities, can be pumped off. The latter feature of pumping impurities is significant for both full scale and research reactors, since the impurities emitted from the walls of the discharge tube can have a deleterious effect on the plasma temperature, and/or confinement.

The heretofore known toroidal divertors comprised an annular ring forming a cylindrically symmetrical divertor chamber encircling the outside of the toroidal discharge tube cross-section and connected to the vacuum chamber therein through a hole on the inside diameter of the ring, such as shown in FIG. 8.13 of "Controlled Thermonuclear Reactions" by Glasstone and Lovberg, Van Nostrand, 1960. The diversion of the outer magnetic flux shell into the divertor chamber was achieved by means of a divertor coil in which flowed the same current that produced the plasma confining axial magnetic field, but in the opposite direction. By means of a vacuum pump, the particles diverted into the chamber through the hole on the inside diameter of the divertor ring were continuously removed. However, these toroidal divertors were limited to stellarators, comprised ring-shaped coils and chambers encircling the outside of the toroidal discharge tube cross-section co-axial with the tube axis and normal to the plane thereof, such that the coil and chamber ring encircled a small cross-section of the plasma column. Additionally, the toroidal divertor rings known heretofore made it difficult to assemble a suitable neutron absorbing shielding blanket along the entire plasma column ring cross-section. It is also advantageous to provide a poloidal divertor in a tokamak, where the toroidal plasma column is stabilized by the combination of an axial magnetic field and a plasma current for producing nested toroidal magnetic flux surfaces by providing a field component that twists the axial magnetic field lines into helixes around the equilibrium axis and produces shear. One such tokamak is described in U.S. Pat. No. 3,663,361.

It is still further advantageous to provide poloidal coils for producing gently curving field lines for vertical and radial stability, an initial plasma current, to remove the divertor coils from a separatrix around a toroidal magnetic field, and to provide a stagnation point on the inside diameter of a toroidal plasma column ring. As is well known in the art, a separatrix is defined as a magnetic flux surface in a set of nested magnetic surfaces, such as provided in a sheared toroidal magnetic field, outside of which the magnetic surfaces have a different shape from those inside. The stagnation point is the place from which the separatrix takes on its different shape, as described in U.S. Pat. No. 3,607,627, and "Plasma Physics," International Atomic Energy Agency, Vienna, 1965, page 391. Such flux surfaces, separatrices and stagnation points are described in U.S. Pat. No. 3,607,627.

SUMMARY OF THE INVENTION

This invention provides a poloidal divertor along the entire length of a magnetically confined toroidal plasma column ring. Moreover, this invention provides a divertor with a space for a thick shielding blanket close to the plasma column ring along its entire length. To this end, this invention provides a divertor, comprising a set of poloidal coils co-axial with the toroidal plasma column ring around its axis of rotation.

In one embodiment a toroidal magnetic field having an annular magnetic separatrix is provided in a tokamak, and the divertor coils are well removed from the separatrix, thereby providing space for a thick shielding blanket between the divertor coils and the toroidal plasma column ring. In another aspect, the stagnation point of the separatrix is on the inside major diameter of the toroidal plasma column ring, thereby contributing to the equilibrium of the plasma ring. Also, the radii of the divertor coils are all greater than the radius of the separatrix, so as to contribute to the aspect ratio of the device.

In still another aspect, vertical poloidal field coils are provided in which the distribution of the ampere turns provides for a vertical cross-field with the proper curvature for a full equilibrium and stability of the plasma. Additionally, the vertical field coils are used for the initial induction of a current in the plasma for the ohmic heating thereof.

More particularly, this invention provides a poloidal divertor for a magnetically confined toroidal plasma column ring of plasma particles having toroidal nested magnetic surfaces along an endless equilibrium axis around an axis of rotation at the center of the plasma ring, comprising means having poloidal coils co-axial with the plasma ring that produce an annular separatrix that curves in cross-section through a stagnation point between the plasma ring and its axis of rotation for collection of particles from the plasma along the separatrix. In one embodiment, an annular discharge tube is bifurcated into two annular arms each containing in cross-section an arm of the separatrix, and means are provided for collecting the plasma particles from a set of nested magnetic surfaces along the entire cross-sectional length of the surfaces, the separatrix surrounding the outer surface for receiving and transporting the particles into collecting means along the entire length of the toroidal plasma ring. Thus, the divertor provides a protective sheath and scrape-off layer around the plasma where heat and impurities can be removed from the plasma ring along its entire cross-sectional length. In the specific example described, the divertor has two arms having cooled collecting plates forming annular divertor chambers connected to a discharge chamber that is bifurcated at an annular hole into narrow throats that reverse their direction along the entire length of the toroidal plasma ring cross-section for communicating with the scrape-off layer along a separatrix that curves around a shielding blanket from a stagnation point between the plasma ring and its axis of rotation. With the proper selection of components, as described in more detail hereinafter, the desired divertor is achieved.

It is an object of this invention, therefore, to provide a poloidal divertor for a toroidal plasma column ring.

The above and further novel features and objects of this invention will appear more fully from the following detailed description of one embodiment of this invention, and the novel features will be particularly pointed out in the appended claims.

BRIEF DESCRIPTION OF THE DRAWINGS

In the drawings, where like elements are referenced alike.

DETAILED DESCRIPTION OF A PREFERRED EMBODIMENT

Figure 1:
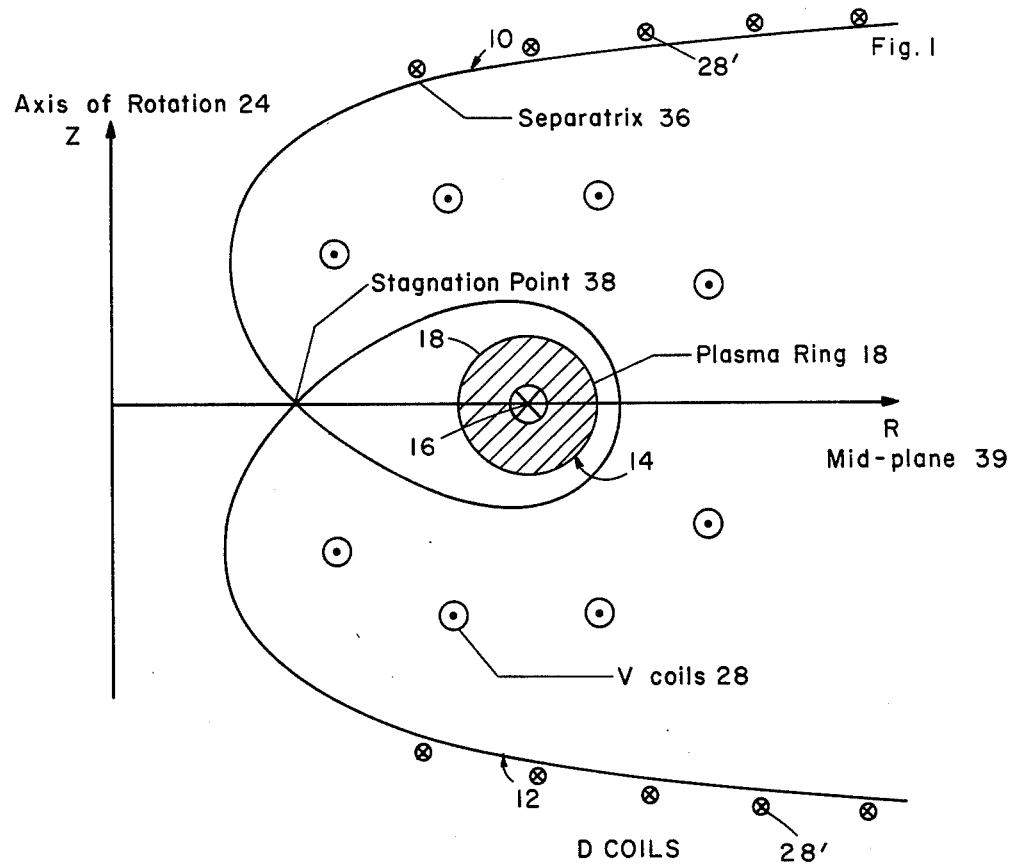
FIG. 1 is a partial cross-section of a toroidal plasma column ring having poloidal divertor coils co-axial therewith for producing the annular separatrix of this invention.

This invention is useful for diverting particles from a toroidal plasma column ring containing the wide variety of plasma particles to which the previously employed fusion reactors have been employed along an endless equilibrium axis. As such, this invention is particularly useful in any full scale toroidal fusion reactor, but the principles of this invention are useful in tokamaks, alcators, ormaks, toroidal multipoles, spherators, stellarators or other toroidal fusion reactors.

In connection with the tokamak described herein, which employs the best mode of the divertor of this invention, it is known that tokamaks provide means for magnetically confining a high temperature toroidal plasma column ring having a large cross-sectional diameter that is symmetrical around an axis of rotation. To this end, the tokamak has toroidal magnetic field coils arranged on a cylinder in a moment-free toroidal magnet design, as described in co-pending application Ser. No. 245,147, filed Apr. 18, 1972. The toroidal field coils produce a toroidal magnetic field that is combined with a plasma current for producing concentric, cylindrical, and nested magnetic surfaces for confining a toroidal plasma column ring within the boundary of the outer magnetic flux shell of these surfaces. To this end, the plasma is contained by the toroidal magnetic field, in a toroidal ring, and a plasma current flows along the equilibrium axis of the plasma ring around its axis of rotation. The means for inducing the plasma current to flow inductively, comprise a co-axial set of poloidal field coils that extend longitudinally along the outside of the discharge tube in curves parallel to the curving equilibrium axis of the toroidal plasma column ring. Such a system is provided in the above-mentioned U.S. Pat. No. 3,663,361, the principles of which are employed in accordance with this invention, wherein these sets of coils also provide a vertical equilibrium field for centering the plasma column ring in the discharge tube. Should these coils be arranged as vertical field coils, and oppositely energized co-axial poloidal divertor coils be added, as will be understood in more detail hereinafter, there is provided a separatrix having a magnetic flux surface shape that is different from the shape of the nested magnetic surfaces inside the separatrix. The separatrix curves from a stagnation point between the plasma ring and its axis of rotation so that the divertor is provided along the separatrix. This has the advantage that a poloidal divertor is provided along the entire length of the plasma ring, and a thick shielding blanket can be placed close to the plasma between the plasma and the divertor coils and the actual divertor means so as to receive the plasma particles and impurities as cooled products after they diffuse outwardly from the center of the plasma column. The divertor of this invention provides a space for a neutron absorbing and shielding blanket for normal resistance or superconducting coils between the coils and the plasma column ring of sufficient thickness, e.g. up to at least one meter, for protecting the coils against radiation damage for operating the coils for a period of up to at least five years. The distribution of the ampere turns in the vertical field coils provides for a vertical cross-field for full equilibrium of the plasma. Likewise, the vertical field coils are used for the initial induction heating of the plasma in the plasma column ring by ohmic heating.

FIG. 1 illustrates one half of a cross-section of the preferred embodiment of the divertor 10 of this invention for a tokamak 12 having a concentric set of nested toroidal magnetic surfaces 14 around an endless equilibrium axis 16 for confining a toroidal plasma column ring 18 symmetrically around an axis of rotation 24 that passes through the annulus of the plasma ring, the plasma comprising fully ionized charged particles that are produced in a vacuum from a gas, as understood in more detail hereinafter. The divertor coils comprising oppositely energized poloidal V and D coils 28 and 28' produce a separatrix 36 having magnetic lines of force that curve around the V coils 28 (i.e. the poloidal vertical field coils) from a stagnation point 38 between the plasma ring and the axis of rotation 24. This stagnation point is on the inside diameter of the plasma column ring in the midplane 39 of the plasma ring. This contributes to plasma equilibrium. To this end, the poloidal divertor D coils 28' are energized oppositely from the V coils 28 and the radii of the polidal divertor coils 28' are greater than the radius of the separatrix at the stagnation point to contribute to the aspect ratio of the reactor. The aspect ratio is the ratio of the plasma ring major to minor radius. The described poloidal coils thus cause the plasma particles to diffuse from the plasma column 18 outwardly from the equilibrium axis 16 through the nested magnetic surfaces 14 toward the portion of the separatrix adjacent to the outer-most magnetic surface, which forms a flux shell around the plasma. Also, any material, such as impurities, sputtering from the wall of the discharge tube 44, which is non-magnetic and shown in FIG. 2, will first enter the scrape-off layer formed by the separatrix 36, and if the sputtered material is in ionized form, it will tend to follow the separatrix and so be led into the divertor 10 along the magnetic lines of force provided by the separatrix.

Figure 2:
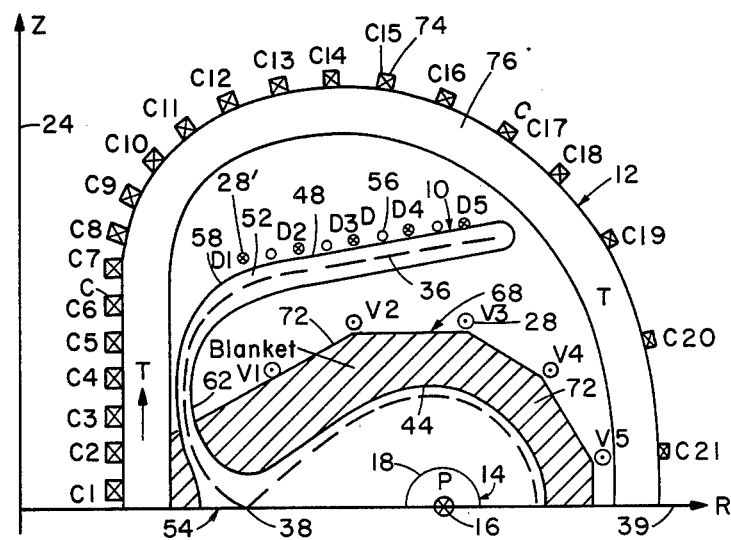
FIG. 2 shows the apparatus of FIG. 1 with a shielding blanket inside the poloidal divertor coils of FIG. 1 for the toroidal plasma column ring thereof.

As shown in FIG. 2, which shows further details of the divertor 10 of FIG. 1, divertor 10 has non-magnetic collector plates 48 forming annular non-magnetic collector chambers 52, which are connected to the main non-magnetic discharge tube 44 through a common annular hole 54 concentric with the axis of rotation 24. The charged particles diffusing slowly outward across the toroidal plasma confining magnetic field represented by magnetic surfaces 14 eventually reach the outmost lines of magnetic flux, and are diverted into chambers 52 to collide with the divertor chamber walls formed by collector plates 48, where they give up their kinetic energy as heat. Since these divertor chambers 52 have large wall surface areas, they are capable of being cooled by water cooling coils 56, not withstanding the enormous energy flow impinging upon the walls in the form of charged particles.

If the impurities are to be kept out of the plasma column 18, the back flow of neutral particles from the divertor chambers 52 to the main discharge tube 44 must be minimized, and the same requirement applies to the thermonuclear reaction products that are removed from the full scale operating reactor, but there are a number of circumstances that help reduce this back flow of these diverted particles. For example, pre-baking the main discharge tube and pumping it to a low pressure for long periods of time have had successful precedents in the stellarator art. Moreover, most of the particles are released from the collector plates 48 in neutral form, and these can be successfully removed by the high speed pumps used in stellarators heretofore. If the rate of removal does not keep pace with the rate of release, the back flow of neutral atoms into the main discharge tube 44 is then determined by the pressure attained in the divertor chambers 52 and the gas kinetic conductance through the annular hole 54 of the divertor chambers 52. Accordingly, the opening width of this hole 54 must be minimized, but this is accomplished simply and effectively to maintain the desired balance, since the divertor chambers 52 form two, annular, longitudinally extending arms 58 that bifurcate from the discharge tube at annular hole 54 into narrow annular throats 62 that reverse their direction along the entire length of the plasma ring 18 in the vicinity of the stagnation point 38. Moreover, any diverted ions that succeed in passing out of the divertor chamber 52 are still within the scrape-off sheath and so tend to be drawn back into the divertor 10 before diffusing across the lines of force into the center of plasma column ring 18.

Figure 3:
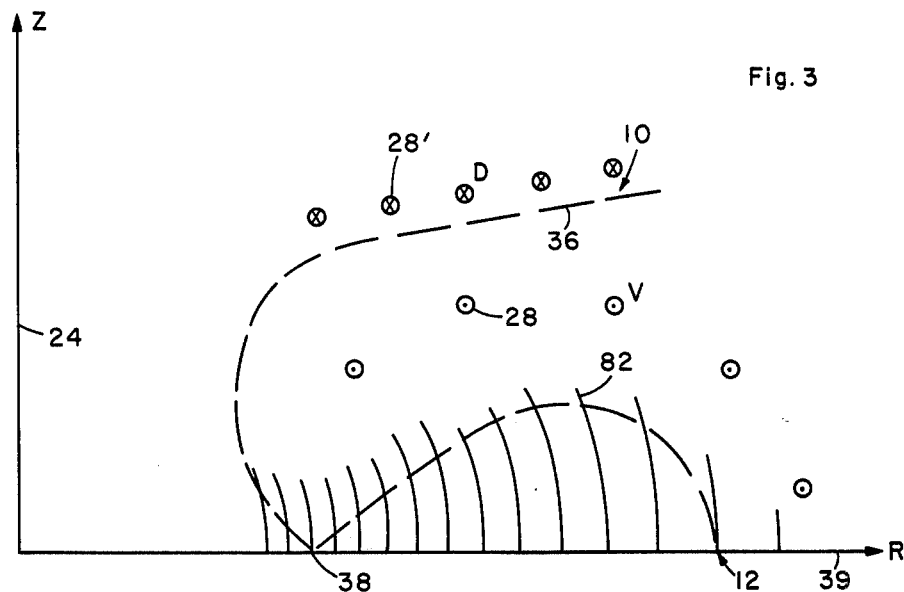
FIG. 3 is a partial schematic view of the vertical field lines of the apparatus of FIG. 2.

In connection with one example of a tokamak, the described divertor 10 leaves a large space 68 close to the toroidal plasma column 18 for a thick shielding blanket 72, as shown in cross-section in FIG. 2, the blanket being interposed between the plasma column 18 and the described V and D coils 28 and 28'. In this example of a preferred embodiment, this blanket is 1 meter thick, so that the coils 28 and 28' are protected from neutrons from the plasma and other reaction products for long periods of time. Thus, the shielding blanket, which is made of conventional neutron absorbing materials, substantially absorbs any neutrons generated in the plasma column 18. One blanket is described in U.S. Pat. No. 3,736,539 and co-pending application Ser. No. 220,905, filed Jan. 26, 1972, now abandoned. It comprises borated water containing borax that is circulated in the blanket inside a lead shield for stopping gamma rays produced in the blanket from neutrons produced in the plasma column ring. This kind of blanket removes heat in the form of steam for a power reactor and it is advantageous for a catalyzed d-d reactor containing D, T and $He^3$, as described in the above-cited co-pending application Ser. No. 220,905, now abandoned since it eliminates the need for external breeding of tritium and/or $He^3$. However, any other conventional neutron absorbing blanket, such as described in the cited Glasstone reference, can alternately be used by suitably changing the fuel mixture. The poloidal control coils 74, which are located on the exterior of the toroidal field coils 76 shown on cylinder 77 in FIG. 2, provide for a desired $d\phi/dt$ during the operating phase, which in turn produces a desired toroidal E field within the plasma column ring 18. The direction of the current flows in the toroidal and poloidal field conductors shown is indicated by either arrows, or a dot in a circle to show a direction out of the plane of the paper, and a cross in a circle to show a direction into the plane of the paper. FIG. 3 illustrates a plot of the gently curving vertical field lines 82 that are produced in the absence of a plasma current in the toroidal plasma column 18. As will be understood in the art, these gently curving field lines, which are produced by the V and D coils 28 and 28', are advantageous for vertical and radial stability of the plasma current.

While the arrangement and energization of the described coils is complicated, such complications have been solved through computer codes. Also, the container 44 is non-magnetic, which simplifies the calculation and arrangement of the desired curving separatrix, which is annular and has in cross-section a stagnation point on the inside diameter of the plasma ring that is symmetrical with the plasma ring around its axis of rotation. Moreover, such calculations follow the principles of the well known Maxwell's equations independently of the plasma theory. One skilled in the art can calculate, plot, make and actually use the configuration of the magnetic field of the divertor 10 of this invention and the adjacent region of the discharge tube 44 for various coil designs and divertor dimensions. Actual plots, in fact, have been made for one example of this invention at Princeton University, and these plots are shown roughly to scale, but reduced in size from actual reactor dimensions in the described figures. An example of the discharge tube cross-section parameters for an operating reactor 12, will be understood from Princeton University Report MATT-949, Jan. 1973. The parameters for basic power supply equipment will be understood from AEC Project Matterhorn Report PM-529 (NYO-7899) (1957), since the basic C stellarator, and ST tokamak equipment at Princeton University that was derived from the C stellarator can be used for reactor 12. The desired magnetic field lines and fluxes are measured by conventional probes and methods, such as described in U.S. Pat. No. 3,580,802.

Figure 4:
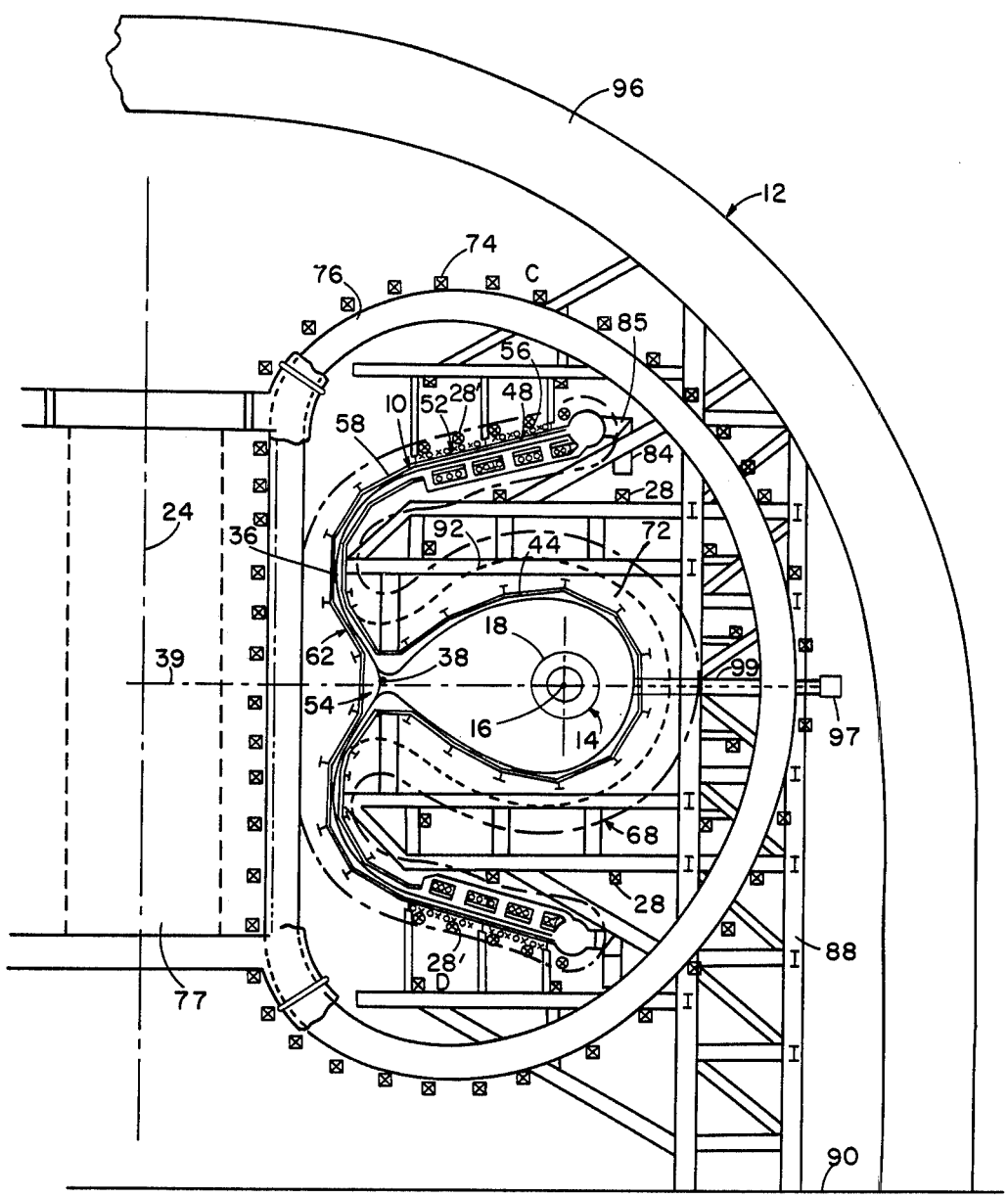
FIG. 4 shows further details of the apparatus of FIG. 2.

FIG. 4 shows details of the support structure 88 of the divertor 10 and the vertical and divertor coils 28 and 28' for one reactor 12. This structure 88 supports the vacuum pumps 84 that continuously evacuate the reactor 12 through ducts 85, and comprises suitable beams fixed to the floor 90, for also supporting a blanket 72 having a lead radiation shield 92 around the blanket. The other supported components of the reactor, comprise the toroidal field coils 76, the toroidal discharge tube 44, poloidal control coils 74, the central cylinder 77, and cooling coils 56 for the divertor 10. A biological shield 96, such as concrete, surrounds the operating tokamak reactor 12. As understood in the art, a neutral beam of particles can be injected into the plasma ring 18 along the mid-plane of the reactor 12 from a source 97 through an inlet 99 supported at least in part by the supporting structure 88.

In operation, the conductors are standard normal resistance conductors, but in future scale models under active consideration, these conductors will be superconductors as understood from U.S. Pat. No. 3,177,408. The normal resistance conductors or the superconductors can be in standard liquids or liquid gases in a standard cryostat, such as understood in the art from FIG. 3 of U.S. Pat. No. 3,461,410. The desired magnetic field lines and surfaces are determined by resonant source and detector probes, as described in U.S. Pat. No. 3,580,802. These probes are inserted in inlet 99, and/or like inlets, which are also adapted for electron beam probes, and/or solid object probes. The pumps 84 continuously evacuate a stainless steel discharge tube 44 to a vacuum pressure of $10^{-10}$ millimeters of mercury through hole 54, which connects with the pumps through a stainless steel divertor chamber 52. Niobium lines and tubes can also be used since they getter impurities, are non-magnetic and they have a low neutron capture cross-section. The evacuation continues for several hours, while the discharge tube is baked at 450° C. for four hours, or until impurities no longer sputter from the discharge tube wall. Deuterium gas containing $\frac{1}{2}$% tritium and 15% helium-3 is initially leaked into the discharge tube by standard leak valves through inlet 99 until a pressure of about $10^{-8}$ millimeters of mercury is obtained in the discharge tube, as determined by standard gauges and/or laser interferometry. This gas is ionized and heated with a plasma current in the toroidal magnetic field produced by coils 76 to form a plasma column 18 having a plasma current and nested magnetic surfaces therein along the equilibrium axis 16, the V coils 28 being used for initial ohmic heating. The V coils 28 along with the oppositely energized D coils 28' produce the described separatrix 36, stagnation point 38, and gently curving field lines.

Figure 5:
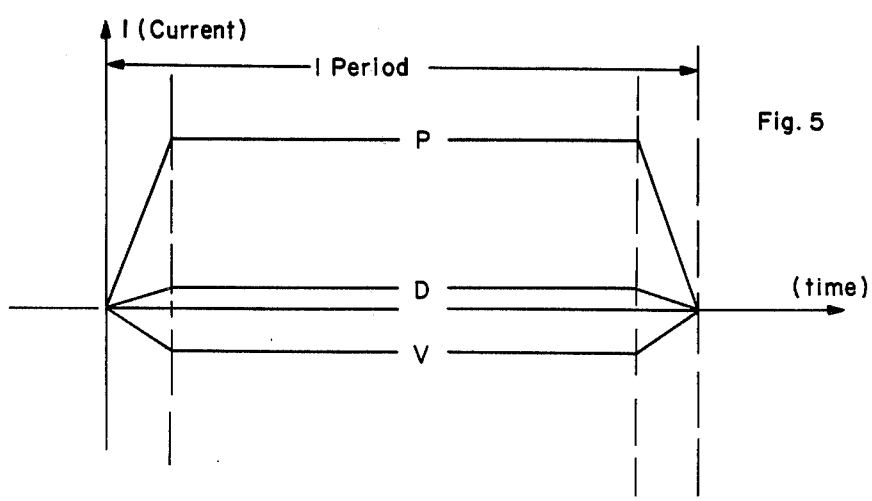
FIG. 5 is a graphic illustration of the currents in the poloidal coils of FIG. 2.

The current profiles for energizing and operating a tokamak reactor 12 having conventionally energized toroidal field coils 76 whose currents increase to a predetermined constant value, are shown in FIG. 5. From the P plasma current curve, it will be seen that the plasma current P increases due to the increasing V current in coil 28, and the V and D currents in coils 28 and 28' are synchronized with each other and with the current in the toroidal field coil 76. The coils 28 and 28' are energized as if they are locked together to increase and/or decrease oppositely and/or to remain constant in opposite directions at exactly corresponding predetermined values to produce the described separatrix and stagnation point on the inside of the annulus of the plasma column ring as described. The plasma column ring is magnetically confined in the toroidal field produced by coil 76, and it is centered away from the walls of the discharge tube by the initially increasing plasma current and the increasing vertical field, which are understood from FIGS. 3 and 5, during the time when the vertical field increases to a constant value, as shown in FIG. 5. When the poloidal coil currents are constant the current in the poloidal control coils 74 can diminish. When the plasma current remains constant, the divertor and vertical fields remain constant. When this current and these fields remain constant or increase or decrease respectively, they produce the separatrix 36 and the stagnation point 38 on the inside diameter of the plasma ring 18. This separatrix thereupon guides the particles that diffuse across the plasma column along with any impurities that remain in the discharge tube into divertor 10 where they strike the collector plates 48 in divertor chamber 52, which is cooled by cooling coils 56. Water is ordinarily used for cooling coils 56, but these cooling coils are not limited to water, and any other cooling fluid may be used, such as the cryogenic cooling means described above.

When it is desired to end a cycle, the plasma current P is reduced by reducing the divertor current D and the vertical field current V, as shown in FIG. 5. Then a new cycle can be begun by leaking more fuel in the form of a gas into the discharge tube 44 through inlet 85.

In an example of the poloidal divertor of this invention for a toroidal plasma column ring having a diameter of 11 meters and a blanket 1 meter thick, the currents in the coils of FIG. 2 are as shown in Table I. The plasma current produced in the plasma, which is initially heated ohmically by V coils 28, has a value of 14.63 megamperes, which current is produced in a toroidal field for confining a plasma in a vacuum of about $10^{-8}$ mm of Hg at a plasma particle number density of about $10^{13}$ particles/cm$^3$, the plasma being centered in a poloidal magnetic field having a vertical magnetic field component produced in accordance with known laws of physics and electricity as applied to a tokamak.

While the above has described one fuel mixture, it is understood that any heretofore known fuel mixture can be used. For example, 50% T and 50% D are advantageous.

It is also understood in the art that a solenoid, Bitter plates, as described in co-pending application Ser. No. 123,319, filed Mar. 11, 1971, now U.S. Pat. No. 3,778,343 or other conventional windings can be used for the toroidal field coils, depending on the size of the reactor, the cross-sectional size of the plasma, and the confining field strengths that are desired.

This invention has the advantage of providing a poloidal divertor having poloidal divertor and vertical field coils co-axial with a toroidal plasma column ring. The divertor of this invention has the advantage of providing a large space for a thick shielding blanket of up to at least 1 meter or more close to a plasma ring, and for providing a divertor along the entire length of the plasma ring around the axis of rotation of the plasma ring. In one embodiment, a poloidal divertor is provided for a tokamak having a separatrix in which poloidal divertor and vertical field coils are well known from the separatrix. In another aspect, the stagnation point of the separatrix is on the inside diameter of the plasma ring, thereby contributing to the equilibrium of the plasma ring. Also, annular divertor coils are provided having radii greater than the radius of an annular separatrix, so as to contribute to the aspect ratio of the plasma ring. In further aspects, the distribution of the ampere-turns in annular coils provides for a vertical cross-field with the proper curvature for a full equilibrium and stability of the plasma, and also provides for the initial induction of a plasma current in the plasma ring.

TABLE I

| Ampere - turns of Poloidal Field Coils | | | |
|---|---|---|---|
| Coil | NI | Coil | NI |
| | (Meg Amperes) | | (Meg Amperes) |
| Plasma | 14.63 | | |
| V1 | 5.22 | C1 | 1.666 |
| V2 | 3.71 | C2 | 1.666 |
| V3 | 4.15 | C3 | 1.666 |
| V4 | 2.09 | C4 | 1.666 |
| V5 | 2.03 | C5 | 1.670 |
| D1 | 1.46 | C6 | 1.666 |
| D2 | 1.17 | C7 | 1.776 |
| D3 | 1.90 | C8 | 1.761 |
| D4 | 0.73 | C9 | 0.377 |
| D5 | 2.34 | C10 | 0.903 |
| | | C11 | 0.446 |
| | | C12 | 0.594 |
| | | C13 | 0.314 |
| | | C14 | 0.202 |
| | | C15 | 0.126 |
| | | C16 | 0.073 |
| | | C17 | 0.051 |

TABLE I-continued

| Ampere - turns of Poloidal Field Coils | | | |
|---|---|---|---|
| Coil | NI | Coil | NI |
| | | C18 | 0.038 |
| | | C19 | 0.031 |
| | | C20 | 0.027 |
| | | C21 | 0.026 |

What is claimed is:

1. A poloidal divertor in combination with first means for magnetically confining a symmetrical toroidal plasma column comprising:
   (a) a plasma column (18) having a first direction of current flow (16), said plasma column being magnetically confined in a ring centered about a generally vertical axis (24) and generally horizontally bisected by a mid-plane (39) defined by the rotation of the radial axis (R) of said first means;
   (b) a first set of coil means (28) having a direction of current flow generally opposite to the plasma current for maintaining said plasma in equilibrium and for forming separatrices and stagnation points, all of said stagnation points being located on said plane and radially in from said plasma column, said coils being spaced from said plasma column and from said mid-plane and arranged in an arc generally transverse to said mid-plane and generally co-axial to said plasma column;
   (c) a second set of coil means (28') having a direction of current flow in the same direction as the current flow in the plasma column for shaping the separatrices, said second set of coil means being spaced radially outward of said plasma column and said first set of coil means generally co-axial with said plasma column and arranged in an arc shape generally parallel to the mid-plane for bending the separatrices around the plasma column but confining said separatrices within the first means whereby the poloidal divertor provides for a relatively large volume of space to be available around said plasma column.

2. The poloidal divertor of claim 1, in which said first coil means produces a set of nested, co-axial magnetic surfaces around said vertical axis for magnetically confining plasma particles and for diffusing said particles outwardly from said vertical axis toward said separatrix.

3. The poloidal divertor of claim 1 including means for collecting plasma particles, comprising means for collecting said plasma particles along the entire length of the plasma ring column.

4. The poloidal divertor of claim 3 in which said means for collecting said plasma particles comprises a discharge tube bifurcated into arms along the entire inside diameter of the plasma column for collecting said plasma particles in said arms.

5. The poloidal divertor of claim 3 in which said means for collecting said plasma particles provides a protective sheath and scrape-off layer where heat and impurities can be removed as cooled products from said plasma column along its entire length.

6. The poloidal divertor of claim 1 having a neutron absorbing and shielding blanket between said first coil means and said plasma column.

7. The poloidal divertor of claim 1 in which the separatrix has a stagnation point on the inside diameter of said toroidal plasma column.

8. The divertor of claim 1 in which said separatrix and said first and second coil means are annular, and said second set of coil means has radii greater than the radius of the separatrix.

9. The divertor of claim 1 in which said first coil means are for the initial induction of a current for ohmically heating plasma particles in said toroidal plasma column.

10. The poloidal divertor of claim 1 having a discharge chamber that is bifurcated into narrow throats that reverse their direction along the entire length of the toroidal plasma column.

11. The method of diverting plasma particles that diffuse outwardly in plasma apparatus containing a magnetically contained symmetrical toroidal plasma column comprising the steps of:
   a. producing a toroidal plasma column having a first direction of current flow of plasma particles along an equilibrium axis;
   b. confining the plasma column in a magnetic field produced by a first set and a second set of field coil means, said magnetic field having magnetic field lines forming a nested set of toroidal magnetic surfaces defining a flux shell around the plasma;
   c. using said first set of magnetic field coil means having a direction of current flow generally opposite to the plasma current flow to form separatrices that communicate in a generally vertical plane and through a narrow throat means with stagnation points being on a ring inside said plasma column and in a horizontal plane defined by a first ring which in turn is defined by the major diameter of the plasma column;
   d. further using said second set of magnetic field coil means having a direction of current flow generally in the same direction as said plasma current flow to bend said separatrices around the plasma column so as to provide a relatively large space between the separatrices and the plasma column;
   e. diffusing the plasma particles by collisions among the plasma particles outwardly away from the equilibrium axis of the plasma column, through the nested set of magnetic surfaces toward the portion of the separatrix adjacent to the outer-most magnetic surface, and through the stagnation points;
   f. thereupon receiving and transporting the particles passing through the stagnation points along the separatrices in poloidal collecting means; and
   g. collecting the diffusing particles received and transported along the separatrices in the poloidal collecting means to prevent the recycling of the particles received and transported by the separatrices back into the plasma column.

* * * * *